United States Patent
Van Dokkum et al.

(10) Patent No.: US 12,189,155 B2
(45) Date of Patent: Jan. 7, 2025

(54) TELESCOPES AND IMAGERS INCLUDING TILTABLY MOUNTED NARROWBAND INTERFERENCE FILTERS

(71) Applicant: Yale University, New Haven, CT (US)

(72) Inventors: Pieter Van Dokkum, New Haven, CT (US); Roberto Abraham, Oakville (CA); Deborah Lokhorst, Toronto (CA)

(73) Assignee: Yale University, New Haven, CT (US)

( * ) Notice: Subject to any disclaimer, the term of this patent is extended or adjusted under 35 U.S.C. 154(b) by 0 days.

(21) Appl. No.: 17/231,150

(22) Filed: Apr. 15, 2021

(65) Prior Publication Data

US 2021/0325586 A1    Oct. 21, 2021

Related U.S. Application Data

(60) Provisional application No. 63/010,142, filed on Apr. 15, 2020.

(51) Int. Cl.
*G02B 5/28* (2006.01)
*G02B 23/00* (2006.01)
*G02B 26/00* (2006.01)

(52) U.S. Cl.
CPC ............... *G02B 5/28* (2013.01); *G02B 23/00* (2013.01); *G02B 26/007* (2013.01)

(58) Field of Classification Search
None
See application file for complete search history.

(56) References Cited

U.S. PATENT DOCUMENTS

| | | | | |
|---|---|---|---|---|
| 4,609,822 A | * | 9/1986 | Roche | G02B 5/289 356/519 |
| 7,030,991 B1 | * | 4/2006 | Kampe | G02B 23/00 356/450 |
| 2007/0081261 A1 | * | 4/2007 | Gebelein | G02B 23/125 359/812 |

(Continued)

OTHER PUBLICATIONS

Abraham, R. G. . . . , et al., "Ultra Low Surface Brightness Imaging with the Dragonfly Telephoto Array", https://inspirehep.net, Jan. 21, 2014, 20 pages.

(Continued)

*Primary Examiner* — Derek S. Chapel
(74) *Attorney, Agent, or Firm* — Saul Ewing LLP; Sean Ritchie; Kathryn Doyle (57) ABSTRACT

One aspect of the invention provides a telescope including: at least one lens or mirror arranged to receive collimated light defining an optical axis at a first end and form an image at a last end; and a narrowband interference filter positioned along the optical axis prior to the first end. The narrowband interference filter is tiltably mounted with respect to the optical axis. Another aspect of the invention provides an imager including: an optical collimator; a plurality of lenses or mirrors arranged relative to the optical collimator to receive collimated light from the optical collimator defining an optical axis at a first end and form an image at a second end; and a narrowband interference filter positioned along the optical axis between the optical collimator and the first end. The narrowband interference filter is tiltably mounted with respect to the optical axis.

18 Claims, 6 Drawing Sheets

(56) References Cited

U.S. PATENT DOCUMENTS

| | | | | |
|---|---|---|---|---|
| 2007/0253063 A1* | 11/2007 | Hruska | .................. | G02B 5/284 |
| | | | | 359/589 |
| 2013/0321921 A1* | 12/2013 | Belgum | .................. | G02B 7/005 |
| | | | | 359/578 |
| 2017/0176338 A1 | 6/2017 | Wu | | |

OTHER PUBLICATIONS

Danieli, S., et al., "The Dragonfly Wide Field Survey. I. Telescope, Survey Design and Data Characterization", https://arxiv.org, Oct. 30, 2019, 20 pages.

Goldman, D., "Everything You Always Wanted to Know About Narrowband Filters, But Were Afraid to Ask", Advanced Imaging Conference, Oct. 2007, 40 pages.

Lokhorst, D., et al., "On the Detectability of Visible-Wavelength Line Emission From the Local Circumgalactic and Intergalactic Medium", https://arxiv.org, Apr. 16, 2019, 18 pages.

Van Dokkum, P., et al., "Multi-resolution filtering: an empirical method for isolating faint, extended emission in Dragon y data and other low resolution images", https://airiv.org, Oct. 28, 2019, 17 pages.

Alluxa, "Angle of Incidence (AOI) and Polarization", https://www.alluxa.com/optical-filter-specs/angle-of-incidence-aoi-and-p . . . , downloaded Jan. 20, 2020, 9 pages.

Alluxa, "Ultra-Narrow Bandpass Filters", https://www.alluxa.com/optical-filters/ultra-series-optical-filters-and-coa . . . , downloaded Jan. 30, 2020, 3 pages.

Edmund Optics, "Optical Filters", https://www.edmundoptics.com/knowledge-center/application-notes/opti . . . , downloaded Jan. 20, 2020, 12 pages.

Edmund Optics, "Optical Bandpass Filters", https://www.edmundoptics.com/c/bandpass-filters/617/#, downloaded Jan. 30, 2020, 5 pages.

Wikipedia, "Astronomical filter", https://en.wikipedia.org/wiki/Astronomical_filter, downloaded Dec. 18, 2019, 7 pages.

Wikipedia, "Telescope", https://en.wikipedia.org/wiki/Telescope#Optical_telescopes, downloaded Dec. 18, 2019, 14 pages.

* cited by examiner

TELESCOPES AND IMAGERS INCLUDING TILTABLY MOUNTED NARROWBAND INTERFERENCE FILTERS

CROSS-REFERENCE TO RELATED APPLICATION

This application claims the benefit of priority under 35 U.S.C. § 119(e) to U.S. Provisional Patent Application Ser. No. 63/010,142, filed Apr. 15, 2020. The entire content of this application is hereby incorporated by reference herein.

STATEMENT REGARDING FEDERALLY SPONSORED RESEARCH OR DEVELOPMENT

This invention was made with government support under 1312376 and 1613582 awarded by National Science Foundation. The government has certain rights in the invention.

BACKGROUND OF THE INVENTION

Narrow (~1 nm) interference filters have numerous applications in astronomy, surveillance, and remote sensing. However, they suffer from two limitations. First, due to their narrow bandwidth, a different filter has to be made for every wavelength of interest. Second, placing a narrow interference filter in a fast converging beam degrades its performance and shifts its central wavelength according to the location in the focal plane.

SUMMARY OF THE INVENTION

One aspect of the invention provides a telescope including: at least one lens or mirror arranged to receive collimated light defining an optical axis at a first end and form an image at a last end; and a narrowband interference filter positioned along the optical axis prior to the first end. The narrowband interference filter is tiltably mounted with respect to the optical axis.

This aspect of the invention can have a variety of embodiments. The narrowband interference filter can be further positioned in an entrance pupil of the at least one lens or mirror.

The narrowband interference filter can be configured to filter light having a narrowband wavelength. The narrowband wavelength can be alterable based on tilting the narrowband interference filter.

The narrowband interference filter can further include a nanometer interference filter. The narrowband interference filter can have a length and a width that are equal to or greater than a length and a width of the at least one lens or mirror.

The telescope can further include a camera positioned subsequent to the last end. The camera can be a complementary metal-oxide semiconductor (CMOS) or charge-coupled device (CCD).

The narrowband interference filter can have a Full Width at Half Maximum (FWHM) bandpass of less than 2 nm. The narrowband interference filter can have a Full Width at Half Maximum (FWHM) bandpass of 1 nm or less.

Another aspect of the invention provides an imager including: an optical collimator; a plurality of lenses or mirrors arranged relative to the optical collimator to receive collimated light from the optical collimator defining an optical axis at a first end and form an image at a second end; and a narrowband interference filter positioned along the optical axis between the optical collimator and the first end. The narrowband interference filter is tiltably mounted with respect to the optical axis.

This aspect of the invention can have a variety of embodiments. The narrowband interference filter can be further positioned in an entrance pupil of the at least one lens or mirror.

The narrowband interference filter can be configured to filter light having a narrowband wavelength. The narrowband wavelength can be alterable based on tilting the narrowband interference filter.

The narrowband interference filter can further include a nanometer interference filter.

The narrowband interference filter can have a length and a width that are equal to or greater than a length and a width of the at least one lens or mirror.

The imager can further include a camera positioned subsequent to the last end. The camera can be a CMOS or CCD.

The narrowband interference filter can have a Full Width at Half Maximum (FWHM) bandpass of less than 2 nm. The narrowband interference filter can have a Full Width at Half Maximum (FWHM) bandpass of 1 nm or less.

Another aspect of the invention provides an imager including: an array of telephoto lenses positioned in parallel along a plane, each of the array of telephoto lenses defining an optical axis in parallel with each other; and an array of narrowband filters. Each of the array of narrowband filters is tiltably mounted in-line with the optical axis of a corresponding lens.

This aspect of the invention can have a variety of embodiments. The narrowband interference filter can be further positioned in an entrance pupil of the at least one lens or mirror.

The narrowband interference filter can be configured to filter light having a narrowband wavelength. The narrowband wavelength can be alterable based on tilting the narrowband interference filter.

The narrowband interference filter can further include a nanometer interference filter.

The narrowband interference filter can have a length and a width that are equal to or greater than a length and a width of the at least one lens or mirror.

The imager can further include a camera positioned subsequent to the last end. The camera can be a CMOS or CCD.

The narrowband interference filter can have a Full Width at Half Maximum (FWHM) bandpass of less than 2 nm. The narrowband interference filter can have a Full Width at Half Maximum (FWHM) bandpass of 1 nm or less.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views.

DEFINITIONS

The instant invention is most clearly understood with reference to the following definitions.

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

Ranges provided herein are understood to be shorthand for all of the values within the range. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION OF THE INVENTION

On most telescopes "narrowband" interference filters have a spectral bandwidth that is about 10 nm wide, even though there are many applications where narrower-bandwidth filters are desirable. Filters with smaller bandwidths (1 nm or so) are manufacturable, but these are not usable in practice, for two reasons.

First, a 1-nm bandpass is so narrow that only a small number of objects in the Universe emit light at exactly that wavelength.

The second reason concerns the properties of interference filters in a converging beam. Even the largest interference filters are small relative to the sizes of the telescopes they are used with, so instead of placing a filter in front of the telescope, where it would be most effective, such filters must be placed within a fast converging beam near the focus of the telescope. However, a fundamental limitation of interference filters is that their performance degrades in converging beams: their central wavelength shifts, their peak efficiency drops, and their performance becomes a strong function of position across the field. These limitations increase in severity as the bandpass of the filter is narrowed. For these reasons, very narrow bandpass interference filters cannot be used effectively with large telescopes. Aspects of the invention solves both issues.

Telescope

Figure 1:
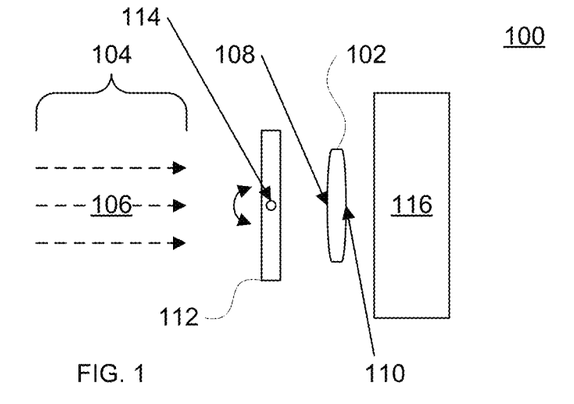
FIG. 1 depicts a telescope according to an embodiment of the invention.

Referring now to FIG. 1, one aspect of the invention provides a telescope 100 including at least one lens 102 arranged to receive collimated light 104 defining an optical axis 106. The lens 102 receives light at a first end 108 and forms an image at a last end 110. (A highly simplified telescope is shown for ease of illustration. Embodiments of the invention can be utilized with a wide variety of telescopes, e.g., those including several lenses and/or mirrors and other elements.)

Narrowband filter 112 is positioned along the optical axis prior to the first end 108. The narrowband filter is tiltably mounted with respect to the optical axis 106. For example, the narrowband filter 112 can be mounted on a pivot 114 that is perpendicular to the optical axis 106. The narrowband filter 112 can be positioned in the entrance pupil of the lens 102. For example, the narrowband filter 112 can be positioned such that all of the incoming light to the lens is filtered by narrowband filter 112. The narrowband filter 112 can have an aperture of the same or larger than the lens 102.

The narrowband filter 112 can have a defined transmission wavelength. In some embodiments the difference between the upper transmission wavelength and the lower transmission wavelength is less than 3 nm, less than 2 nm, between 0.5 nm and 1.5 nm, 1 nm, and the like.

Narrowband filters are available from a variety of sources including Alluxa of Santa Clara, California; Edmund Optics Inc. of Barrington, New Jersey; and Omega Optical, Inc. of Brattleboro, Vermont.

A camera 116 can capture the resulting image.

Imager

Figure 2:
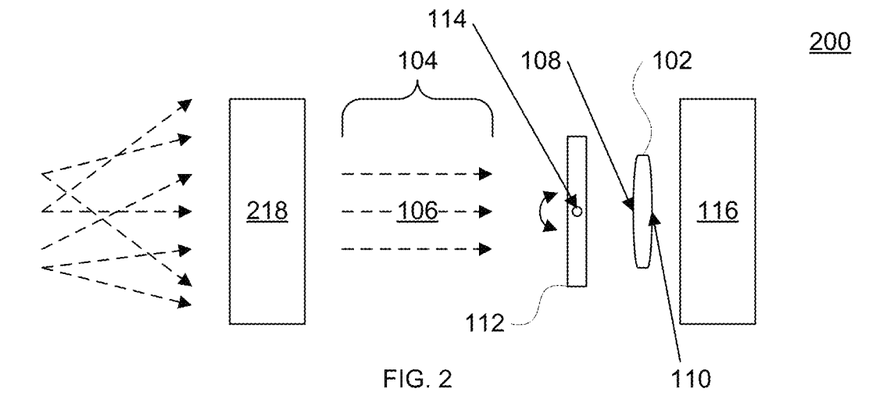
FIG. 2 depicts an imager according to an embodiment of the invention.

Referring now to FIG. 2, another aspect of the invention provides an imager 200. Imager 200 resembles telescope 100, but includes a collimator 218 before the tilting narrowband interference filter 112. This enables imaging of relatively near objects and can be used for applications such as microscopy, medical imaging, endoscopy, and the like.

Application to Imaging Array

Figure 3A:
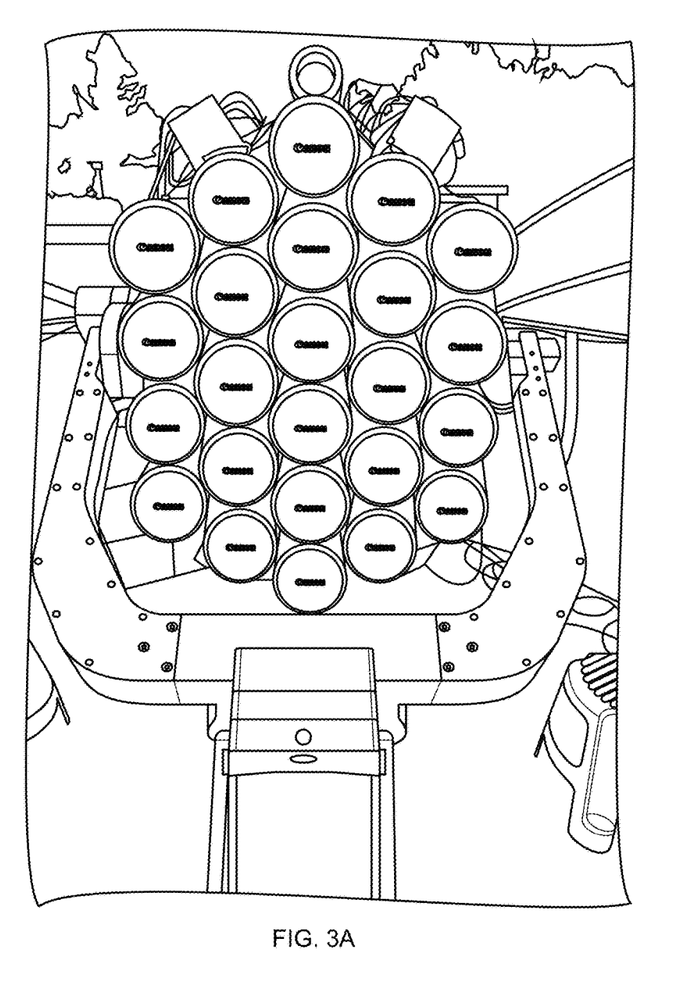
FIGS. 3A and 3B are photographs of a front and back view, respectively, of the DRAGONFLY™ telescope array deployed by Applicant.
Figure 3B:
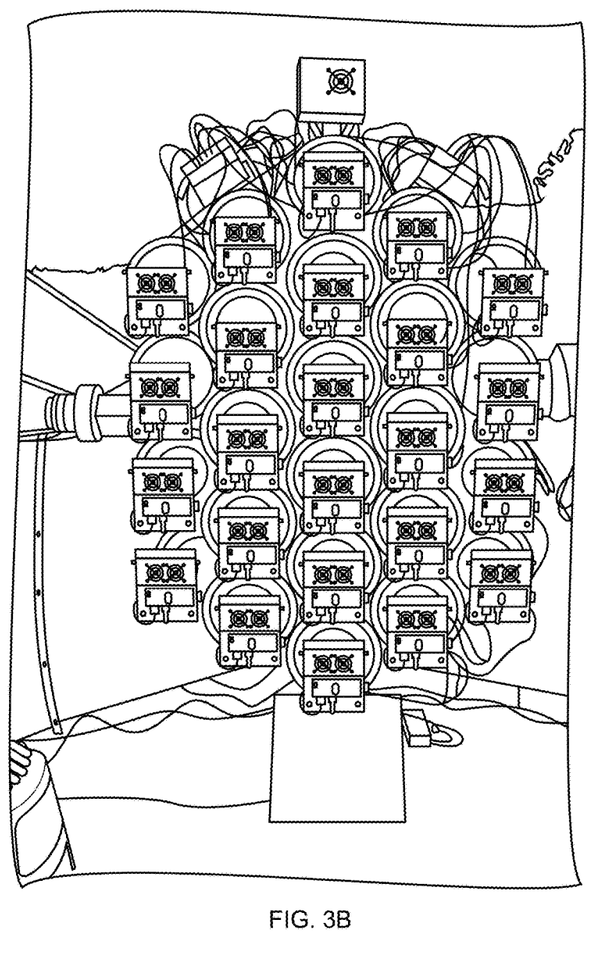
Figure 3C:
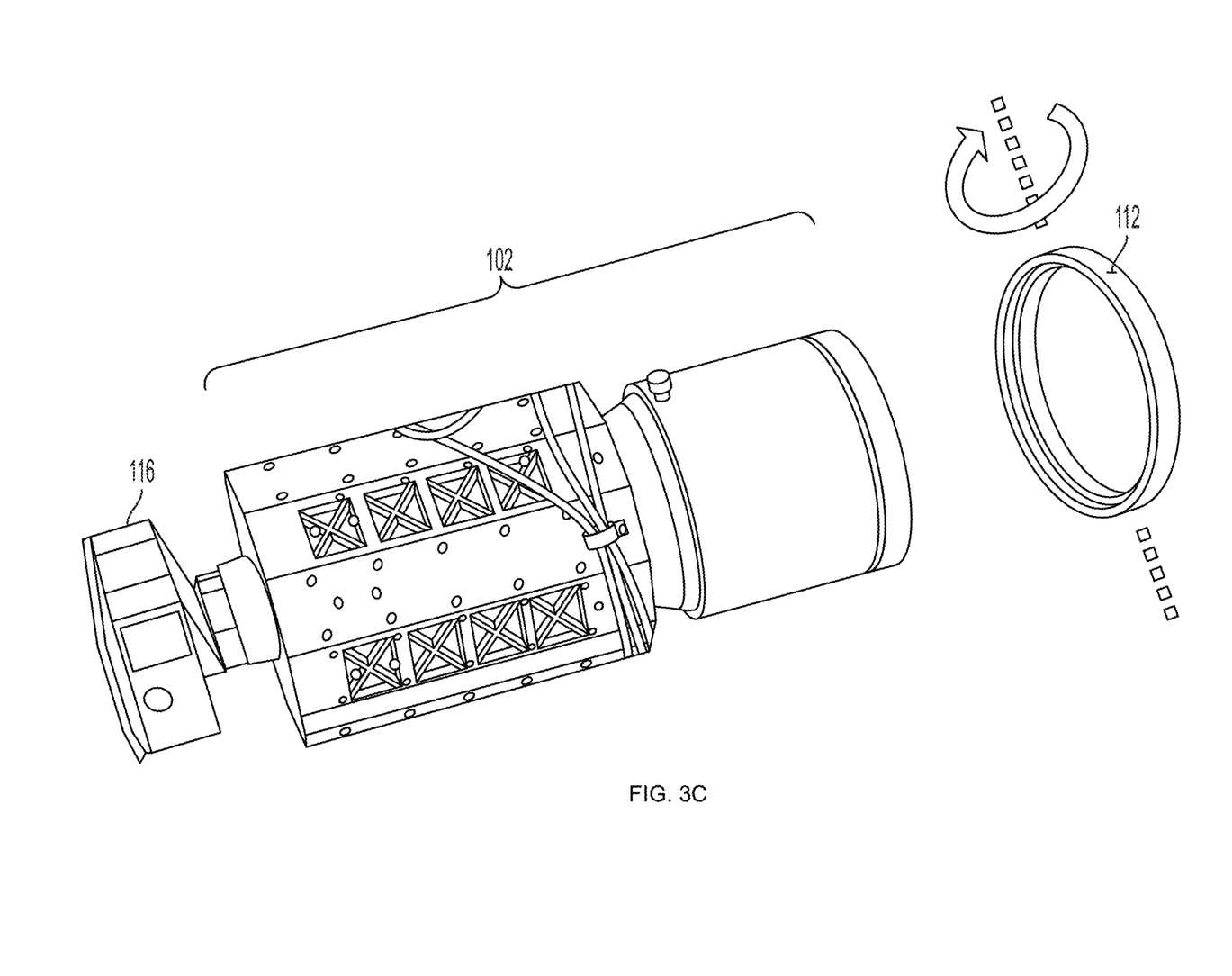
FIGS. 3C-3E depict the positioning and mounting of a tiltable narrowband interference filter before a telephoto lens according to embodiments of the invention.
Figure 3D:
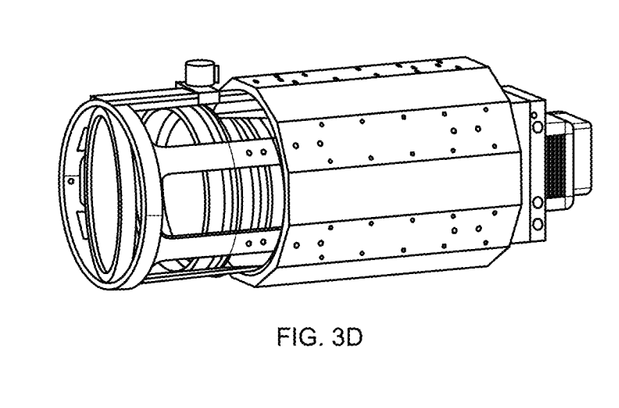
Figure 3E:
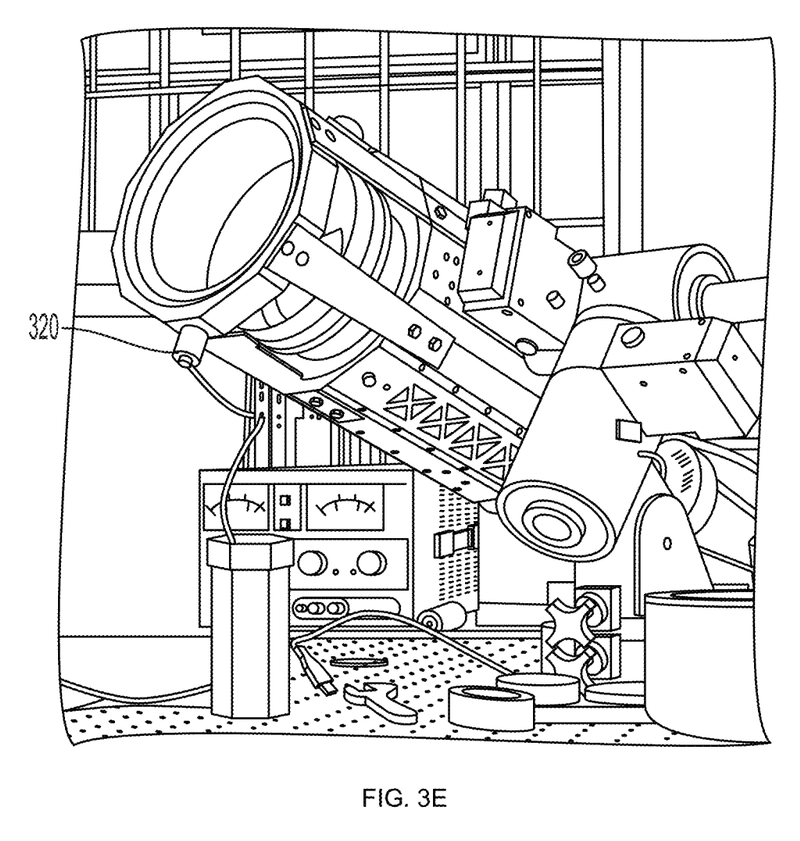
Figure 4:
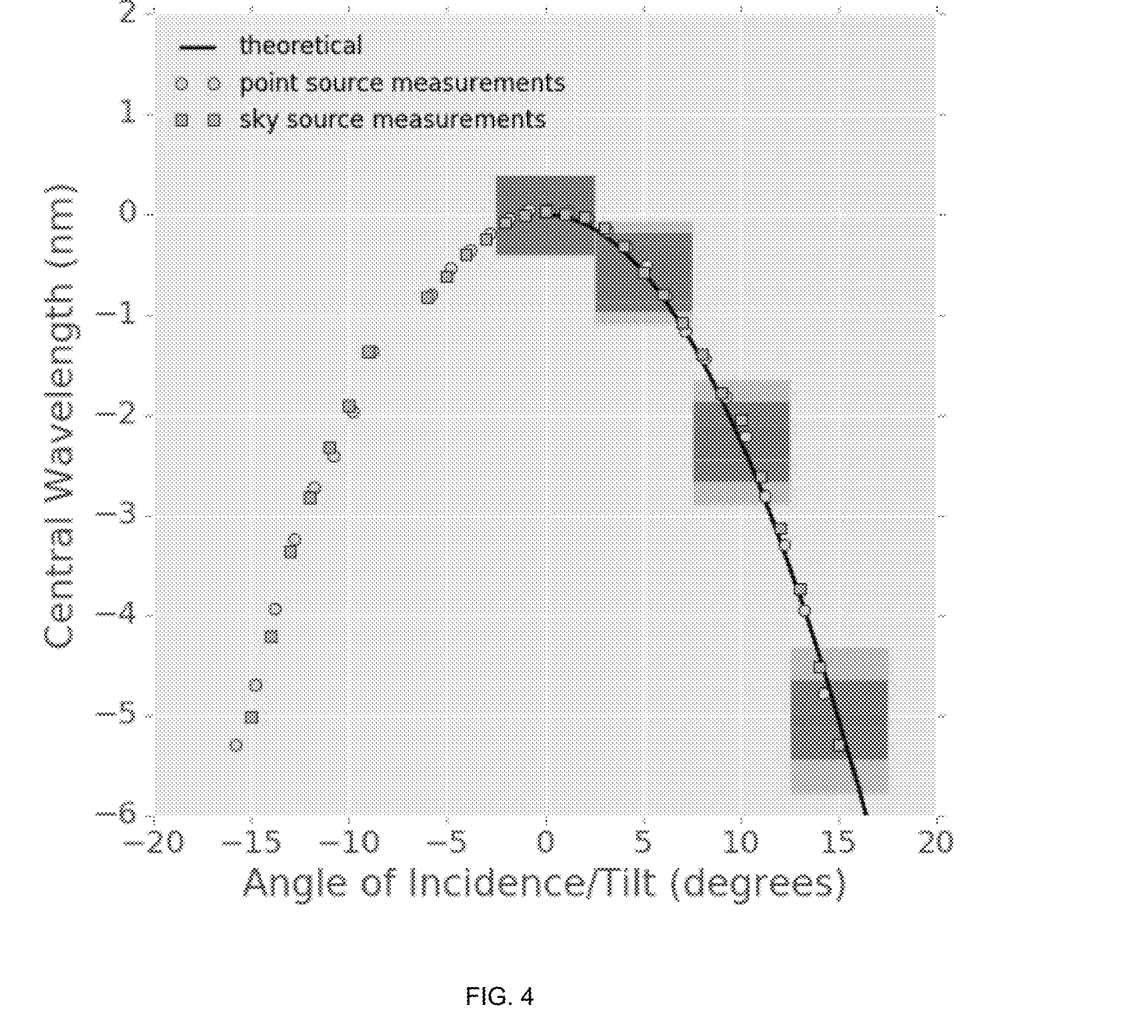
FIG. 4 is a graph depicting experimental verification of narrow-band filter performance as a function of tilt. Agreement with the curve expected from theory (shown in black) is excellent. The blue bands indicate the measured band-pass of the filter at different tilts. At higher tilts, the blue bands separate into shaded areas: the shaded blue bands are the band passes of the filters; the light blue are band-passes at the extreme corners of the field of view.
Figure 5:
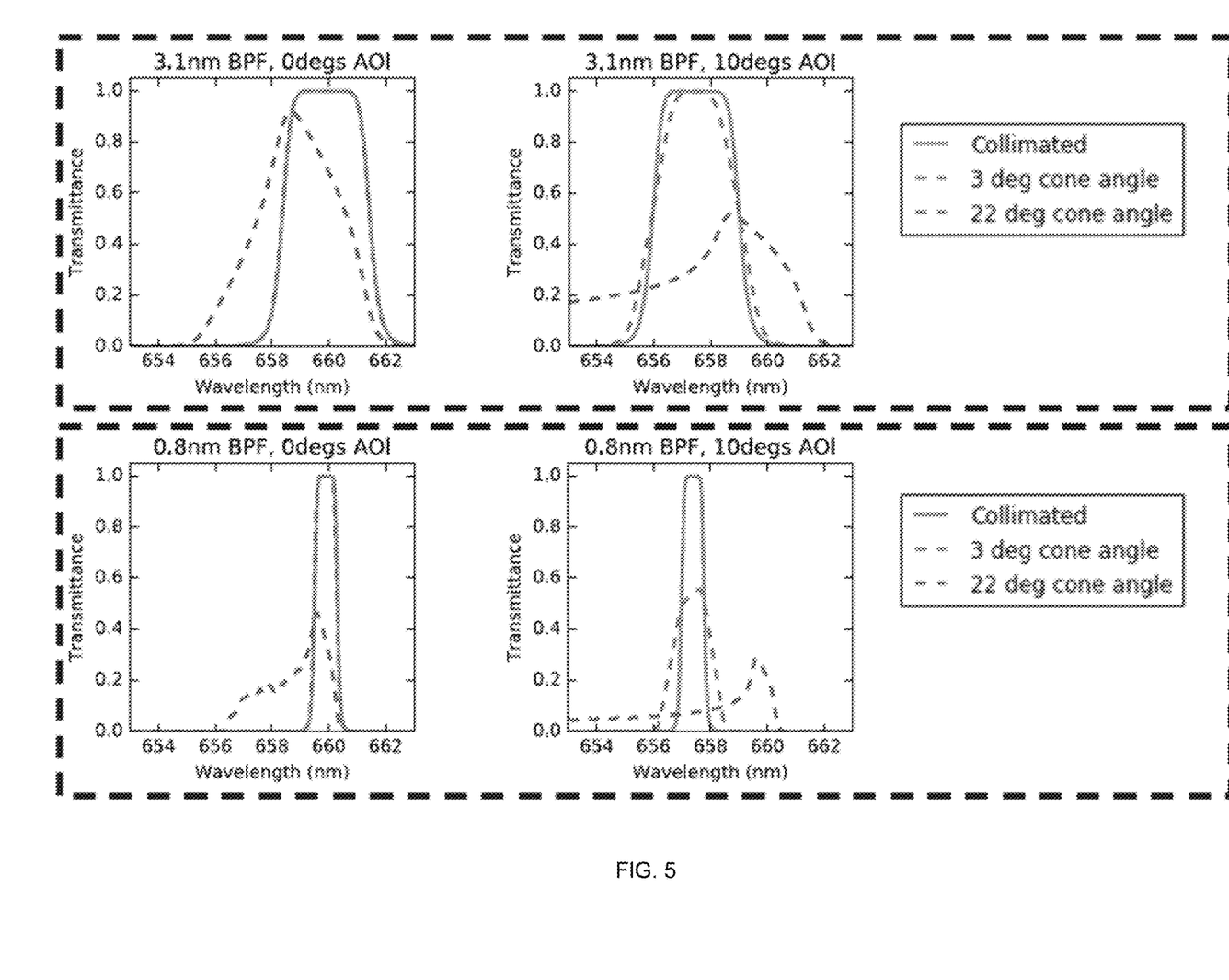
FIG. 5 depicts transmittance for various wavelengths at various tilt.

FIGS. 3A and 3B provide a front (with the input apertures of each telephoto lens) covered by a lens cover bearing the CANON® trademark) and back view, respectively, of the DRAGONFLY™ telescope array deployed by Applicant. FIGS. 3C-3E provides side and perspective views of a single telescope within the array with a tiltable narrowband interference filter 112 positioned along the optical axis prior to the first end of the telephoto lens.

As best seen in FIG. 3E, tiltable narrowband interference filter 112 can be tilted using an actuator 320 such as a motor, a servomotor, and the like.

Individual DRAGONFLY™ lenses 102 are small enough (143 mm aperture in the current telescope) that interference filters 112 can be positioned in front of lenses 102 (at the entrance pupil of the optical system). At this position, the incoming beam is perfectly collimated (with an f-ratio of infinity), so narrow-band filters have excellent performance. Because the DRAGONFLY™ array mimics a large telescope by digitally fusing many images from smaller telescopes together, all the pieces come together to enable a large-aperture ultra-narrow band wide-field imaging telescope to exist. Furthermore, because tilting narrowband filters shifts their central wavelength, by tilting the narrowband filters ahead of the DRAGONFLY™ lenses 102, one can adjust their central wavelength. This means the filter is not sensitive to a single wavelength, as the central wavelength of the 1-nm bandpass can be tuned to the wavelength of interest. This idea therefore turns the DRAGONFLY™ array into both a wide-area narrow-band imager and a potent wide-area imaging spectrometer.

One aspect of the invention achieves extremely narrow band imaging with large-aperture optical systems with very limited or no degradation. This is achieved by (1) splitting the large aperture into multiple small optical elements (such as telephoto lenses) whose images are digitally combined to yield the equivalent of an image of a much larger telescope; (2) placing narrow interference filters in front of these individual optical elements (at the entrance pupil) so they are in the collimated beam; and (3) designing a mechanism to tilt these filters, thereby tuning them to the desired wavelength.

To Applicant's knowledge, such narrow filters have not been used before in imaging applications (at least not in astronomy), because with conventional, unsegmented, telescopes they cannot be placed at the entrance pupil.

The segmented nature of the system makes it extremely scalable. Applicant is planning a setup with 168 individual telephoto lenses, but it is conceivable that telescopes up to 1,000 lenses or mirrors will be constructed in the future, at a cost of tens of $M.

Aspects of the invention can be utilized to create a spectral line mapping telescope that will be an order of magnitude more powerful than its competition. A key innovation is the use of a family of ultra-narrow-band filters that can isolate the glow from nearly invisible (with every other telescope) emission from primordial gas trapped by Dark Matter. This capability can be utilized to directly image the circumgalactic medium, a predicted reservoir of gaseous fuel surrounding all galaxies and driving their star-formation, as well as the "cosmic web", a predicted network of dark matter filaments linking galaxies together (the largest structure in the Universe). Imaging of either of these would be of historic significance for astrophysics.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

The invention claimed is:

1. A telescope comprising:
at least one lens or mirror arranged to receive collimated light defining an optical axis at a first end and form an image at a last end; and
a narrowband interference filter positioned along the optical axis prior to the first end, the narrowband interference filter tiltably mounted with respect to the optical axis;
wherein the narrowband interference filter has a bandpass of less than 3 nm.

2. The telescope of claim 1, wherein the narrowband interference filter is further positioned in an entrance pupil of the at least one lens or mirror.

3. The telescope of claim 1, wherein the wavelengths encompassed by the bandpass of the narrowband interference filter are alterable based on tilting the narrowband interference filter.

4. The telescope of claim 1, wherein the narrowband interference filter further comprises a nanometer interference filter.

5. The telescope of claim 1, wherein the narrowband interference filter has a length and a width that are equal to or greater than a length and a width of the at least one lens or mirror.

6. The telescope of claim 1, further comprising:
a camera positioned subsequent to the last end.

7. The telescope of claim 6, wherein the camera is a complementary metal-oxide semiconductor (CMOS) or charge-coupled device (CCD).

8. The telescope of claim 1, wherein the narrowband interference filter has a Full Width at Half Maximum (FWHM) bandpass of less than 2 nm.

9. The telescope of claim 1, wherein the narrowband interference filter has a Full Width at Half Maximum (FWHM) bandpass of 1 nm or less.

10. An imager comprising:
an optical collimator;
a plurality of lenses or mirrors arranged relative to the optical collimator to receive collimated light from the optical collimator at a first end and form an image at a second end, the collimated light from the optical collimator defining an optical axis; and
a narrowband interference filter positioned along the optical axis between the optical collimator and the first end of the plurality of lenses or mirrors, the narrowband interference filter tiltably mounted with respect to the optical axis;
wherein the narrowband interference filter has a bandpass of less than 3 nm.

11. The imager of claim 10, wherein the narrowband interference filter is further positioned in an entrance pupil of at least one lens or mirror of the plurality of lenses or mirrors.

12. The imager of claim 10, wherein the wavelengths encompassed by the bandpass of the narrowband interference filter are alterable based on tilting the narrowband interference filter.

13. The imager of claim 10, wherein the narrowband interference filter further comprises a nanometer interference filter.

14. The imager of claim 10, wherein the narrowband interference filter has a length and a width that are equal to or greater than a length and a width of the plurality of lenses or mirrors.

15. The imager of claim 10, further comprising:
a camera positioned subsequent to the last end.

16. The imager of claim 15, wherein the camera is a complementary metal-oxide semiconductor (CMOS) or charge-coupled device (CCD).

17. The imager of claim 10, wherein the narrowband interference filter has a Full Width at Half Maximum (FWHM) bandpass of less than 2 nm.

18. An imager comprising:
- an array of telephoto lenses positioned in parallel along a plane, each of the array of telephoto lenses defining an optical axis in parallel with each other; and
- an array of narrowband filters, each of the array of narrowband filters tiltably mounted in-line with the optical axis of a corresponding lens;
- wherein each of the narrowband filter has a bandpass of less than 3 nm; and
- wherein images from the array of telephoto lenses are combined to form a final image.

\* \* \* \* \*